United States Patent [19]

Larson

[11] Patent Number: 5,758,128
[45] Date of Patent: May 26, 1998

[54] OBJECT REFERENCED MEMORY MAPPING

[75] Inventor: Michael K. Larson, Austin, Tex.

[73] Assignee: Cirrus Logic, Inc., Fremont, Calif.

[21] Appl. No.: 673,774

[22] Filed: Jun. 27, 1996

[51] Int. Cl.$^6$ .................................................. G06T 1/60
[52] U.S. Cl. ........................................ 395/507; 395/141
[58] Field of Search .................................. 395/141, 142, 395/133, 115, 111, 507, 523, 525, 521; 345/121, 122, 185, 189

[56] References Cited

U.S. PATENT DOCUMENTS 5,088,050  2/1992  Ito ............................................. 395/141
5,446,836  8/1995  Lentz et al. .............................. 395/141
5,528,737  6/1996  Sfarti ......................................... 395/141
5,563,995  10/1996  Shirouzu .................................. 395/141

*Primary Examiner*—Kee M. Tung
*Assistant Examiner*—Cao H. Nguyen
*Attorney, Agent, or Firm*—Robert V. Wilder; Steven A. Shaw

[57] ABSTRACT

A process and implementing computer system for graphics applications in which polygons from a frame buffer, which may have three dimensional depth, color and other characteristics, are compactly reassembled and drawn to a fast memory for high speed and highly efficient processing. Polygons are divided into shaped segments which correspond to the shapes of the polygons. Corresponding memory storage references to the polygon objects themselves enable optimal processing efficiency and speed.

27 Claims, 7 Drawing Sheets

OBJECT REFERENCED MEMORY MAPPING

REFERENCES TO RELATED APPLICATIONS

Material disclosed but not claimed herein, is disclosed and claimed in the following patent applications, all of which have been assigned to the assignee of the present invention:

"Partial Polygon Drawing With XY Mapped Memory", Attorney Docket No. VSID-001-RVW, Ser. No. 08/671,138 Filed on Jun. 27, 1996.

FIELD OF THE INVENTION

The present invention relates generally to computer graphics and more particularly to signal processing methods for multi-dimensional graphics systems with optimized memory mapping for graphic objects.

BACKGROUND OF THE INVENTION

The use and application of computer graphics to all kinds of systems environments continues to increase to an even greater extent with the availability of faster and faster information processing and retrieval devices. The speed of operation of such devices remains a high priority design objective. This is especially true in a graphics system and even to a greater extent with 3D graphics systems. Such graphics systems require a great deal of processing for huge amounts of data and the speed of data flow is critical in providing a new product or system or in designing graphics systems to apply to new uses.

In the field of computer graphics, many methods exist to draw polygons into a pixel grid. Polygons are used as drawing primitives for many applications such as Graphical User Interfaces, Computer Aided Design and 3D Computer Animation. Most techniques for drawing polygons reduce the polygon to a series of scan lines that align to the edges of the polygon and to the pixel grid. When these methods are implemented in hardware, the pixel grid is generally accessed in a sequential method, i.e. for each XY pixel access, the pixel grid is updated based on the XY address. For a pixel grid that has a large set-up time per pixel update, this can become a time bottleneck for the system.

In all data and information processing systems, and especially in computer graphics systems, much time is consumed in accessing data from a memory or storage location, then processing that information and sending the processed information to another location for subsequent access, processing and/or display. As the speed of new processors continues to increase, access time for accessing and retrieving data from memory is becoming more and more of a bottleneck in terms of system speed.

Graphic systems must be capable of performing more sophisticated functions in less time in order to process greater amounts of graphical data required by modern software applications. There is a continuing need for improvements in software methods and hardware implementations to draw three-dimensional objects using full color, shading, texture mapping and transparency blending.

The development of raster display systems has dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube (CRT) or liquid crystal display (LCD) or the like capable of scanning the entire pixel grid at a relatively high rate to reduce flicker as much as possible.

The pixel data is preferably stored in a frame buffer comprising dynamic random access memories (DRAMs), where each pixel is represented by one or more bits depending upon the desired resolution, color, brightness and other variables. Typical display systems can draw screens with multiple colors with a variety of screen resolutions, such as, but not limited to, 640×480, 800×600, 1024×768, 1280× 1024, or other combinations depending upon the software drivers and the hardware used. A video controller scans and converts the pixel data in the frame buffer to the control signals required by the screen system to display the information on the screen. The video controller scans each of the pixels sequentially, from top to bottom and from left to right, and converts pixel data into intensity values for corresponding pixels on the screen. In a color graphics system using a CRT, three separate beams are controlled i.e. one beam each for each of the primary colors, where the intensity of each of the beams is determined by the pixel value corresponding to the respective colors. A similar system is used for LCD devices. Each pixel value may comprise, for example, 24 bits, i.e. one 8-bit byte for each of the primary colors red, green and blue, where the byte value determines the intensity of the respective color to be displayed.

A pixel grid in memory is a representation of two dimensional space in a linear accessed memory. Linear accessed memory has incrementing addresses for each location in memory i.e. a one dimensional space. A two dimensional space can be represented in one dimensional addressing by creating a pitch value to the "Y" parameter, i.e. for each increment in "Y", a number of pixel grid locations exist in "X". This allows a linear address to be calculated from a two dimensional XY pixel grid access. Most methods for drawing to a pixel grid use the above method to access a pixel grid. The XY mapping is fixed at the time the polygons are being drawn based on the current two dimensional pixel grid in memory. From that point on, the pixel grid, unless noted otherwise, will be assumed to be a fixed two dimensional representation of a pixel grid in linear addressed memory.

A polygon is represented as a set of points in the pixel grid that map to the intersection of the polygon to be drawn. The definition of most lines and polygons are continuous functions that can only be approximated by the pixel grid. Polygons in computer graphics are generally drawn by decomposing the definition of the polygon to a set of boundary conditions called vertex points that represent approximations of the end points of the polygon into a pixel grid. Those vertex points are then decomposed to a set of scan lines for each Y scanning in the X direction for each pixel in the X direction contained within the polygon.

With specific reference to computer graphics applications, representations of images are stored in pixel-oriented frame buffers. The frame of reference for the video buffers is a zero point relative to a matrix of storage positions for storing pixel values and information related to the pixel characteristics which define an image to be displayed. That zero point storage position corresponds to a zero point pixel position on a display screen utilized to display the image comprised of the stored pixels. A string or row of data from the buffer corresponds to a row of pixels on the display screen. As an image is refreshed on a display screen, each line of data stored in the video memory is sequentially accessed from memory and transferred to the display device to fill-in corresponding sequential lines of pixels on the display. Each such access and transfer has a delay time associated therewith which has heretofore been relatively unalterable because of the inherent dependence of the storing process on the scanning process. i.e. the initiation of each line of storage begins with the left-most pixel of each display scan line regardless of the position in the scan line which contains the first bit of image definition. This relationship has required that there be a certain fixed number of accesses, and the delays associated therewith, for a corresponding fixed number of screen scans per screen display.

Current implementations draw each scanline into the pixel grid as a series of XY accesses to the pixel grid. As each pixel is generated, it is written sequentially out to the pixel grid. With the above method of drawing polygons to a pixel grid, the number of accesses to the pixel grid is equal to the number of pixels contained within the representation of the polygon into the pixel grid. For memory subsystems with a relatively large access time for sequential access to the pixel grid, the access time per pixel can be the limiting factor for the number of polygons to be drawn in a timed interval. Many memory subsystems have a large access time but compensate by being able to burst sequential accesses after the first access is made. Accordingly, there is a need for a new method to increase the number of pixels drawn per access so as to reduce the overall number of access operations required as well as reducing the time required and increasing the speed of the system. There is also a need for an improved method and apparatus effective to maximize the number of data processed and also to maximize the informational transfer efficiency i.e. to maximize the percentage of the useful data accessed per scan.

SUMMARY OF THE INVENTION

A method and system is provided for optimally dividing a fast memory into segments wherein each of the segments is related to the shape of a graphics object capable of being drawn on a display device. The method is iterative and continues to define object-referenced minimally sized memory segments until the entire object has been segmented for further processing.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
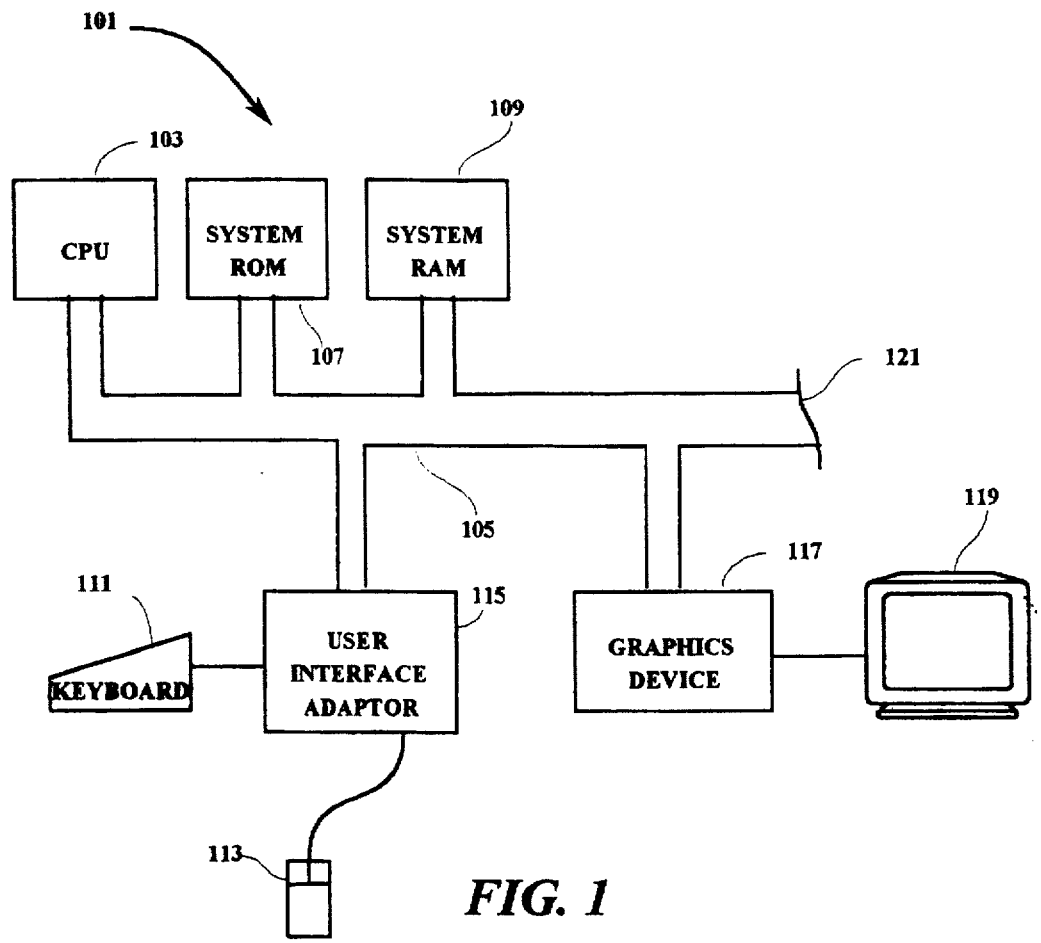
FIG. 1 is a block diagram of a computer system including a graphics system.

According to the disclosed embodiment, a memory with a fast sequential access is used to draw parts of a polygon. A pixel write mask is used to determine which pixels are drawn from the fast sequential access memory to the pixel grid. This allows the pixel grid memory to be burst accessed in two dimensions. The disclosed method is used to determine which parts of the current polygon to be drawn fit into the fast sequential access or scratch pad memory. The scratch pad memory is then filled with the pixels to be drawn. The scratch pad memory does not have fixed XY mapping during the drawing of a polygon as does the pixel grid, but is variable and based on the partial block of the polygon to be drawn. This allows blocks of various widths and heights to be filled in for the polygon. The method of drawing polygons is the scanline method but the Y dimension is broken up into increments of one or more based on the block size that can fit into the scratch pad memory. Each pixel is drawn into the scratch pad memory as though it were drawn to the pixel grid and a pixel write mask is used to track the pixels drawn to the scratch pad. When a block is filled or reaches its limit in Y, it is then transferred to the pixel grid. The pixel write mask is used to determine which pixels are drawn. This keeps the memory subsystem in which the pixel grid is contained in burst mode thereby optimizing the memory bandwidth.

In the disclosed implementation, a 128 byte SRAM may be present on a chip embodiment for use as the scratch pad memory. The pixel grid will be an XY map and may be located in the frame buffer. The scratch pad memory has four power of "2" pitches defined as "1×128", "2×64", "4×32", and "8×16" in XY. The pixel grid mapping is dependent upon the memory mapping mode of the memory control unit. A one bit pixel write mask is used to determine the pixel octbytes (8 bytes) to be written back to memory. The scratch pad memory is reconfigurable based on the number of bytes per pixel format.

With reference to FIG. 1, the various methods discussed above may be implemented within a typical computer system or workstation 101. A typical hardware configuration of a workstation which may be used in conjunction with the present invention is illustrated and includes a central processing unit (CPU)103, such as a conventional microprocessor, and a number of other units interconnected through a system bus 105. The bus 105 may include an extension 121 for further connections to other workstations or networks, and the like. The workstation shown in FIG. 1 includes system random access memory (RAM) 109, and a system read only memory (ROM) 107. The system bus 105 is also typically connected through a user interface adapter 115 to a keyboard device 111 and a mouse or other pointing device 113. Other user interface devices such as a touch screen device (not shown) may also be coupled to the system bus 105 through the user interface adapter 115. A graphics device 117 is also shown connected between the system bus 105 and a monitor or display device 119. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

Figure 2:
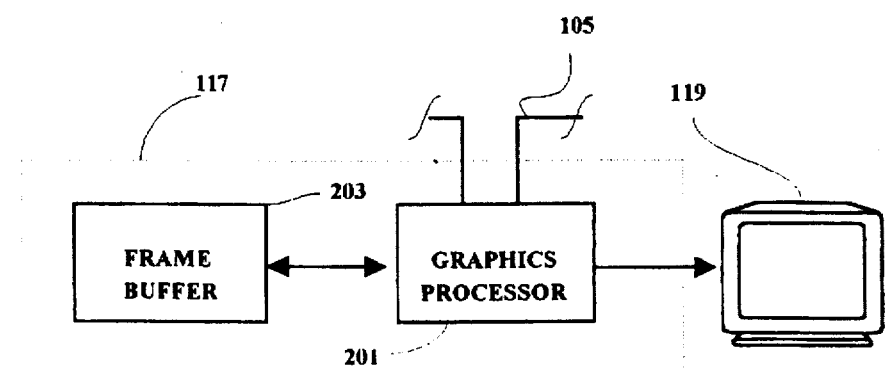
FIG. 2 is block diagram of the graphics device shown in FIG. 1.

In FIG. 2, the system bus 105 is shown connected to the graphics device or subsystem 117. The graphics device 117 may include, for example, a graphics processor 201 which is arranged to process, transmit and receive information or data from a frame buffer unit 203. The frame buffer unit 203 contains frame display information which is accessed by the graphics processor 201 which, in turn, is connected to a display device 119. The display device 119 is operable to provide a graphics display of the information stored in the frame buffer 203 as processed by the operation of the graphics processor 201. Although the present example shows a graphics processor 201 separate from a system CPU 103, it is understood that the present invention is not limited to having a separate graphics processor but rather also includes systems in which the methodology taught herein is implemented within or as part of a single system CPU or other larger system chip or integrated circuit.

Figure 3:
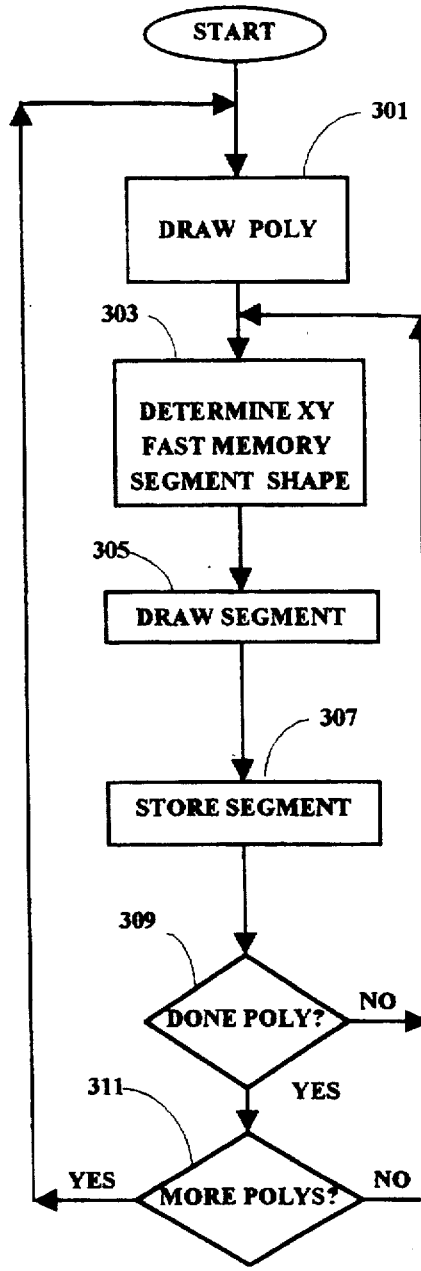
FIG. 3 is a flowchart illustrating an overall methodology for processing graphics display data.

In FIG. 3, the disclosed method begins with a DRAW POLY command 301. The DRAW POLY command references certain information concerning the polygon to be drawn such as the various slopes of the polygon to be drawn as well as the various vertices or points of the polygon. Next the process determines the XY fast memory segment size 303. This process will be explained in more detail in connection with FIG. 4 through FIG. 8, but it is noted that the segment size determining step enables fast memory usage optimization so that a fast sequential access is used to draw parts of a polygon and a pixel write mask is used to determine which pixels are drawn from the fast sequential access memory to the pixel grid or frame buffer for presentation on the screen of the display device.

Figure 4:
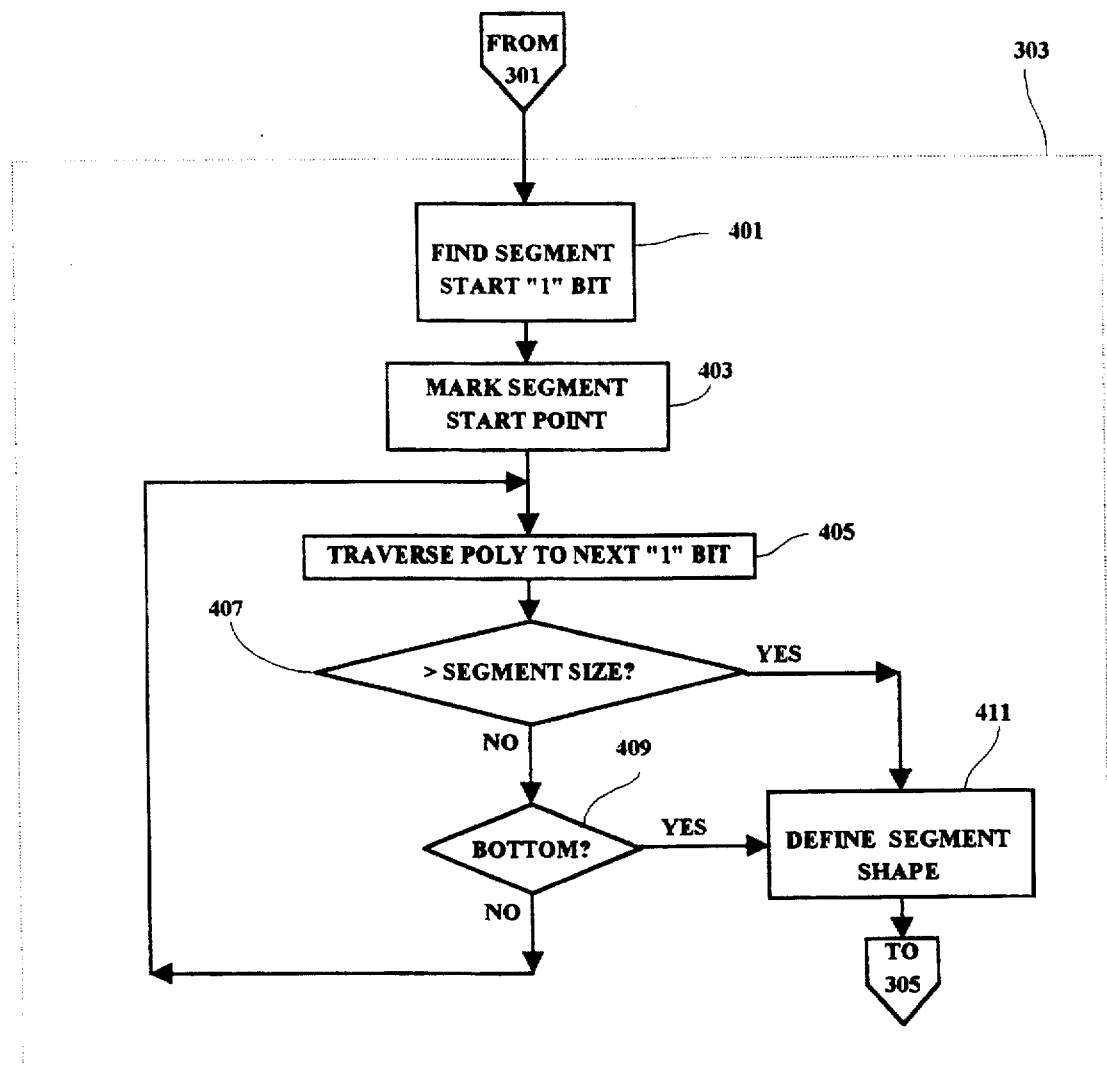
FIG. 4 is a flowchart illustrating an operational flow for an optimized memory segmentation data storage method.
Figure 5:
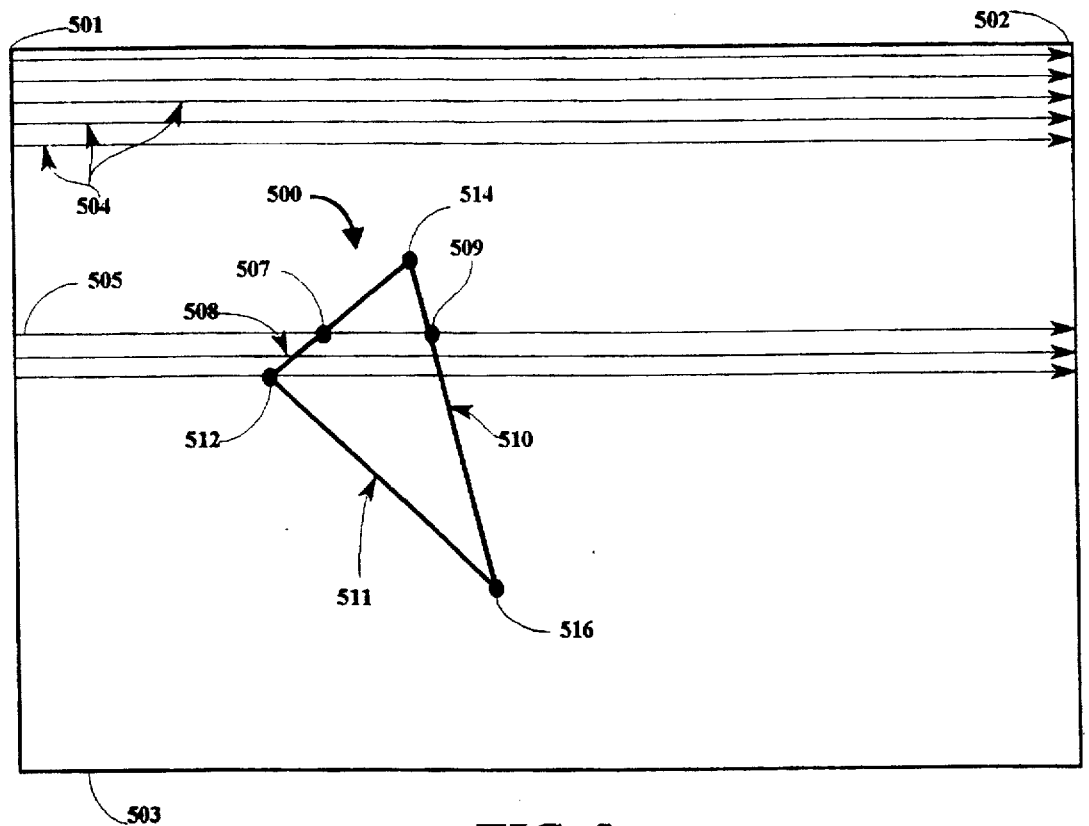
FIG. 5 is an illustration of the scanning of an object on a display screen.

Following the determination of the segment sizing 303, the segments are drawn 305 into a fast sequential memory, for example an SRAM. The SRAM in the present example in built into the graphics chip, but it is understood that system or other off-chip SRAM may also be used. In the present disclosure, the terms "SRAM", "fast memory" and "fast sequential access memory" are used interchangeably to refer to a so called "scratch pad memory" which is contained in the graphics subsystem processor 201 in the present example. After the segment is draw into the scratch pad memory 305, the segment is stored 307 as will be hereinafter explained in more detail in connection with FIG. 10. Following the segment store step 307, a determination is made whether the polygon to be drawn in response to the DRAW POLY command has been completed 309. If, following the last segment store, there remain further portions of the polygon which have not yet been segmented, the process returns to the top of the segmentation sizing step 303 to define the next segment section of the polygon to be drawn. This iterative process continues until the entire polygon to be drawn has been segmented and the DONE POLY determination 309 returns an affirmative response. At that time a determination is made regarding whether or not there are any more polygons to be drawn for any particular image frame to be displayed on the display device 119. If more polygons are to be drawn, the process returns to the initial step to draw the next polygon DRAW POLY 301. After all of the polygons for a particular frame image have been drawn 305 and stored 307, and there are no more polygons to be drawn 311, the partial object memory mapping process is completed 313. FIG. 4 shows the segment sizing or object segmentation step 303 in more detail. In order to more fully appreciate the segmentation process of FIG. 4, reference should also be made to FIG. 5 through FIG. 8. FIG. 5 shows a screen scanning process in which, in the present example, a CRT screen 503 is scanned from one edge 501 to the opposite edge 502 by an electron beam or beams along scan lines 504. FIG. 5 shows a polygon 500 (a triangle in the present example) being displayed. For the sake of illustration, intersection pixels 507 and 509 are shown enlarged as points of intersection between a raster scan stroke 505 and the polygon or triangle 500. The triangle 500 includes a main base point 516 as well as a "top" point 514 and a vertex point 512. The raster scan 505 intersects the triangle 500 at a point 507 on a "first opposite slope" 508 or edge of the triangle 500 and also intersects the triangle 500 at point 509 on the "main slope" 510 of the triangle 500. Another slope of the triangle 500 is referred to as the "second opposite slope" 511. Generally, in graphics terminology, with reference to a triangular primitive element for example, the "main slope" is defined as the side that spans the entire vertical dimension and includes the longest vertical component of the object e.g. triangle 500. The point 516 at the bottom or base of the main slope is referred to as the "base point". The "opposite" slopes are the sides opposite to the "main slope" and are herein referred to as the "first opposite slope 508 and the "second opposite slope 511" as they are positioned from top to bottom in the display. In general, a frame buffer memory will contain all of the pixel information of each image frame being displayed at any moment. That information contains, for example, all of the blank pixels as well as all of the filled-in or solid dot pixels. When the frame display information is to be processed, especially in graphics systems where such processing is intense, the method of frame information storage as shown in FIG. 5 is considered inefficient and bulky for processing purposes. The segmentation process as herein described may be considered to accomplish an effective streamlining of the object information storage process which allows much faster access and processing of such information.

Figure 6:
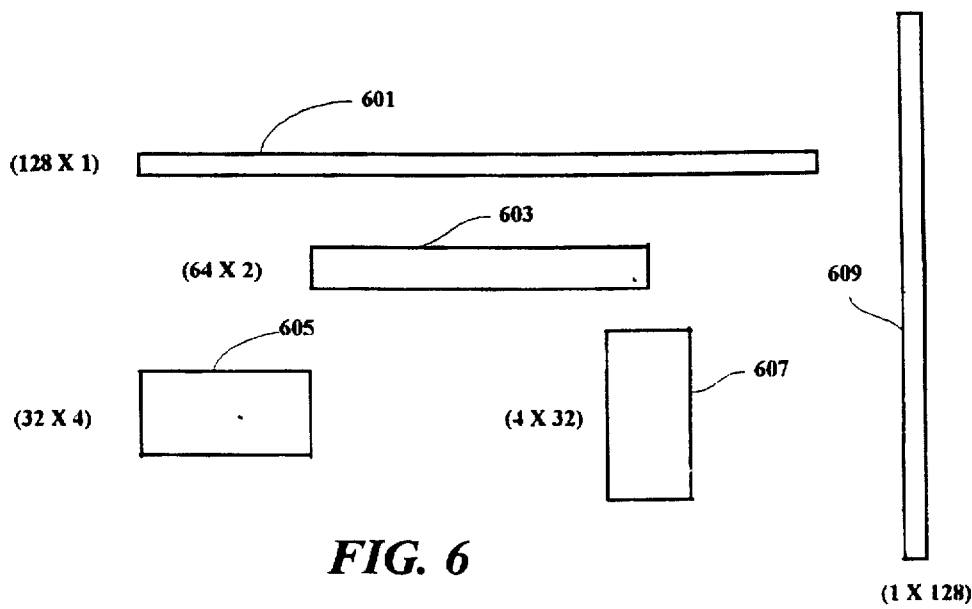
FIG. 6 is an illustration showing several possible partial object-based pixel area coverage patterns.
Figure 7:
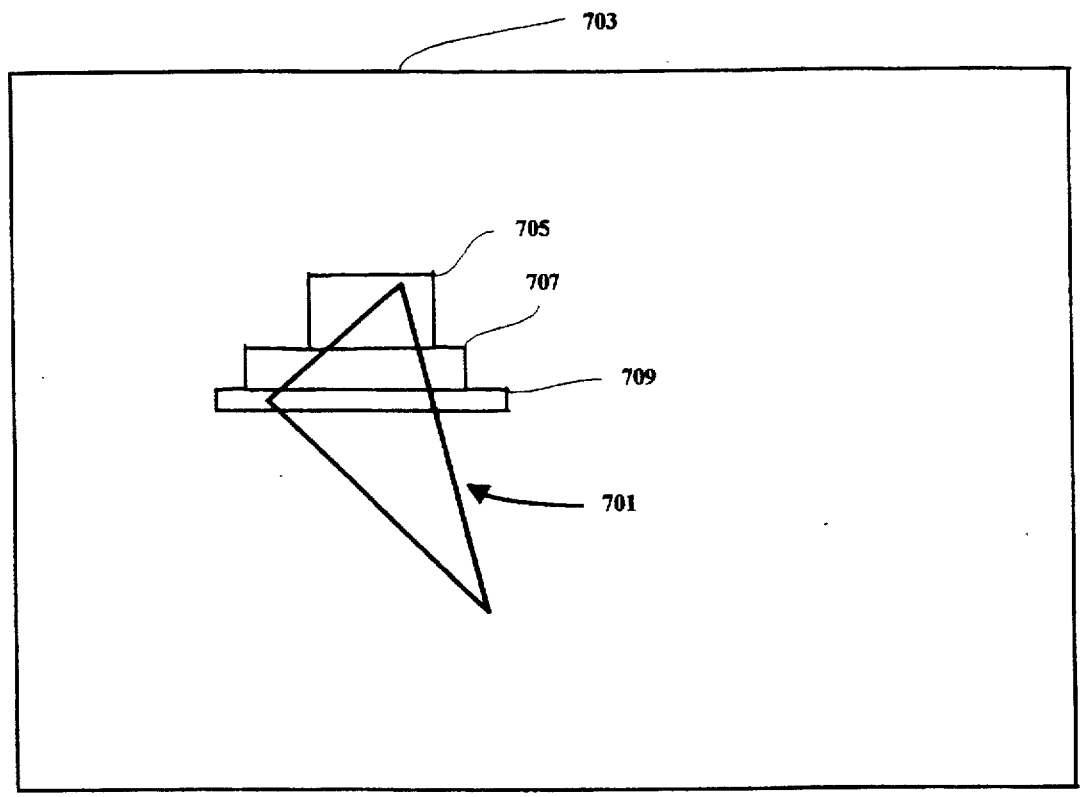
FIG. 7 is an illustration showing an application of pixel coverage patterns upon an exemplary display object.

In FIG. 6, several different layouts or reference orientations for a 128 bit SRAM are illustrated. In the following discussion, the pixel coverage patterns are configured in various shapes which correspond to memory locations and corresponding memory configurations. Also, for purposes of explanation, the term "bit" is used to mean the smallest memory unit and the term "pixel" is used to mean the smallest picture element unit. In a first orientation 601, the memory is configured only 1 bit high by 128 bits long. Another orientation 603 is configured 2 bits high and 64 bits long. Other orientations 605, 607 and 609 illustrate orientations 4 bits high by 32 bits long, 32 bits high by 4 bit long and 128 bits high by 1 bit long, respectively. It can be seen that depending upon the layout or orientation of the 128 bit memory, different corresponding areas of an object being displayed can be "covered". As illustrated in FIG. 7, polygon 701 is positioned on a display screen 703. The display screen 703 contains bits of information which make up pixels on the screen. As hereinbefore noted, the frame buffer of a display system is usually configured such that there is a correspondence between a pixel position relative to the display screen and the position in memory of the bits that comprise or make up the content or substance of the corresponding pixel. As shown in FIG. 7, the segments of memory that contain information concerning the polygon 701 may be referenced to various points of the polygon itself to store the relevant polygon information in a more compact memory area or memory size thereby providing a more efficient information storage system. The configuration of a first memory segment 705 may be nearly as long as it is high since the polygon at that point is not so high. When a memory segment of the configuration shown for the first memory segment 705 is filled with stored bits of polygon information, it is determined that all of the information concerning the polygon has not yet been stored and there is a need to configure another segment of memory to receive additional bits. Since the next segment of the polygon 701 is higher than the first segment, the second segment 707 of memory will be configured with a higher cross dimension but a shorter length dimension in order to optimally store all of the relevant polygon information in as compact a space as possible. Similarly, the next memory segment 709 is also optimally configured for maximum data storage efficiency for the polygon to be drawn on the display 703. This technique allows a polygon to be drawn from a fast access SRAM memory for example, using a minimal number of accesses.

Figure 8:
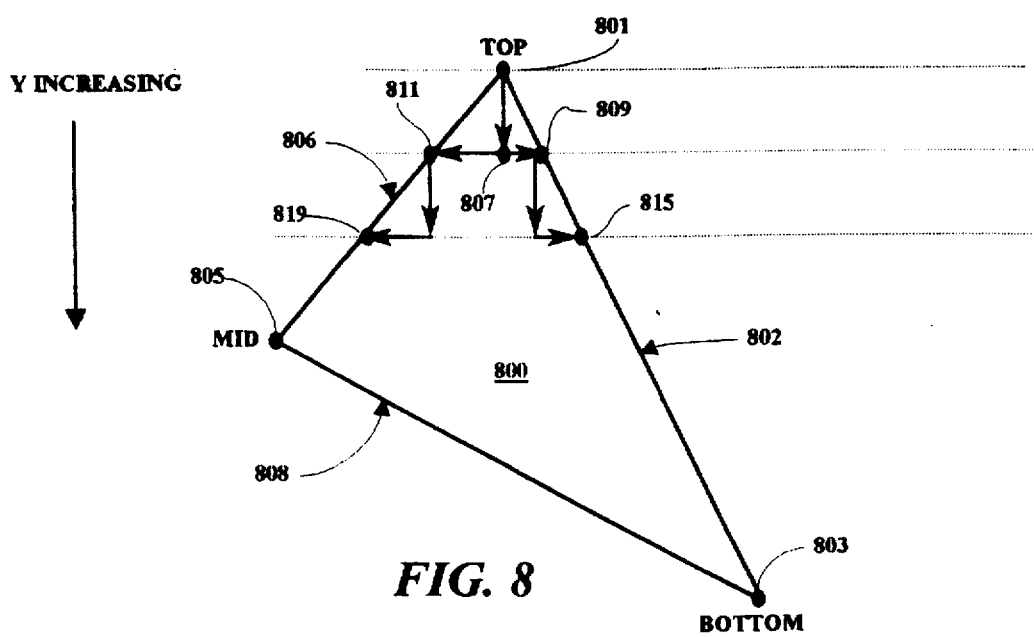
FIG. 8 is an illustration showing a point referenced object scanning method.

FIG. 8 illustrates in more detail, the re-configuring or SRAM "shaping" process by which the information in a frame buffer may be stored more compactly through an object referenced storing method. In FIG. 8, the ordinate "Y" is increasing in the downward direction as shown. The polygon illustrated is in the form of a triangle having a TOP point 801 at the top of the triangle, a BOTTOM point 803 at the lower end of a Main Slope 802, and a MID point or vertex 805 joining first and second opposite slopes 806 and 808, respectively.

With reference to FIG. 4 and FIG. 8 in more detail, the method for determining 303 the fast memory or SRAM segment sizes begins after a DRAW POLY command 301 by finding 401 the first "1" bit in the poly to be drawn. Referring to FIG. 8, the first "1" bit, in the present example, is the TOP point 801 of a polygon 800. It should be noted that the DRAW POLY command includes information concerning the slopes and vertices or points of the object or poly to be drawn. Accordingly, the location of the TOP point 801 is known by the process when the DRAW POLY command is generated. The method next marks 403 or stores the location of the first "1" bit as a segment START point for future reference. This point will correspond to the beginning of an object based configuration of a fast SRAM memory unit. With that reference point, the method determines which SRAM configuration will most efficiently store the next segment of the polygon. For example, using a 128 bit memory unit as a base in the present example, the method next moves relative to the START point 801 as illustrated in FIG. 8, to map points on the polygon 800 until 128 bits have been utilized in the process. It is noted that each incremental movement in the "Y" direction is referred to as a "count" and requires a predetermined number of bits in moving from one horizontal line to the next. To the vertical movements are added the number of bits that are required to be utilized to move from the vertical drop point 807 to the main slope 802 at point 809 and also from the first vertical drop point 807 to the first opposite slope 806 at point 811. More specifically, the method begins to "TRAVERSE THE POLY TO THE NEXT "1" BIT" 405 or filled pixel in the polygon 800. In the present example, the method "looks" in an increasing "Y" direction in an incremental fashion one count at a time, and then looks for the next "1" bit in each opposing horizontal direction. Each time a "1" bit is located, it is marked as a reference relative to the last segment "Start" point 801.

Next it is determined whether or not the difference between the START "1" BIT 801 and the newly located next "1" bit point is greater than the segment size 407, i.e. 128 bits in the present example. If the difference is greater than 128 bits, then the segment size is determined at 128 bits from the START "1" BIT and the segment shape is then defined 411. Similarly, if the segment size 407 is not exceeded by the traversal from the START BIT, and the newly located point is the bottom of the polygon 409, then in that case the segment is also defined and shaped 411. If the "segment size" 407 or "bottom" inquiries return a negative result, the process returns to TRAVERSE THE POLY TO THE NEXT "1" BIT step to find the next "1" bit in the polygon to be drawn. When the "1" bit point is the BOTTOM point of the polygon, the process continues to DEFINE THE SEGMENT SHAPE 411 and returns to DRAW SEGMENT 305 as hereinbefore explained in connection with FIG. 3.

In the "TRAVERSE POLY TO NEXT "1"BIT" step 405, the process searches for the next "1" bit in the polygon 800 in a sequential searching pattern from one intersection "1" bit point, e.g. 811 or 809, to the next 819 or 815, respectively, while at each point checking whether or not the cumulative bits from the last START point remains less than the 128 bit SRAM segment size 415. At each point where the current memory segment size exceeds the base segment size of 128 bits, the segment configuration can be defined and shaped. The width of the segment will be determined by the number of counts or vertical drops that have been used between the START point and the point at which total SRAM memory unit or base capacity of 128 bits is exceeded. The length of the configuration will also be determinable by adding the cumulative horizontal incremental moves during the same period. Thus, the polygon is stored in a pattern dependent upon and with reference to the first "1" bit in the polygon, and the SRAM segment sizes are shaped or configured in various shapes or proportions depending upon maximum polygon "coverage" or bit storage efficiency. The iterative SRAM configuring process will continue until the BOTTOM point 803 of the polygon 800 is encountered at which time the method returns to the DRAW SEGMENT step 305 in FIG. 3. Thereafter, in accordance with the method illustrated in FIG. 3, the SRAM shaping process continues until all of the polys to be drawn are totally stored in the newly defined compact form in a fast access Scratch Pad SRAM, and referenced to the poly object itself, in accordance with the present method.

Figures 9, 10:
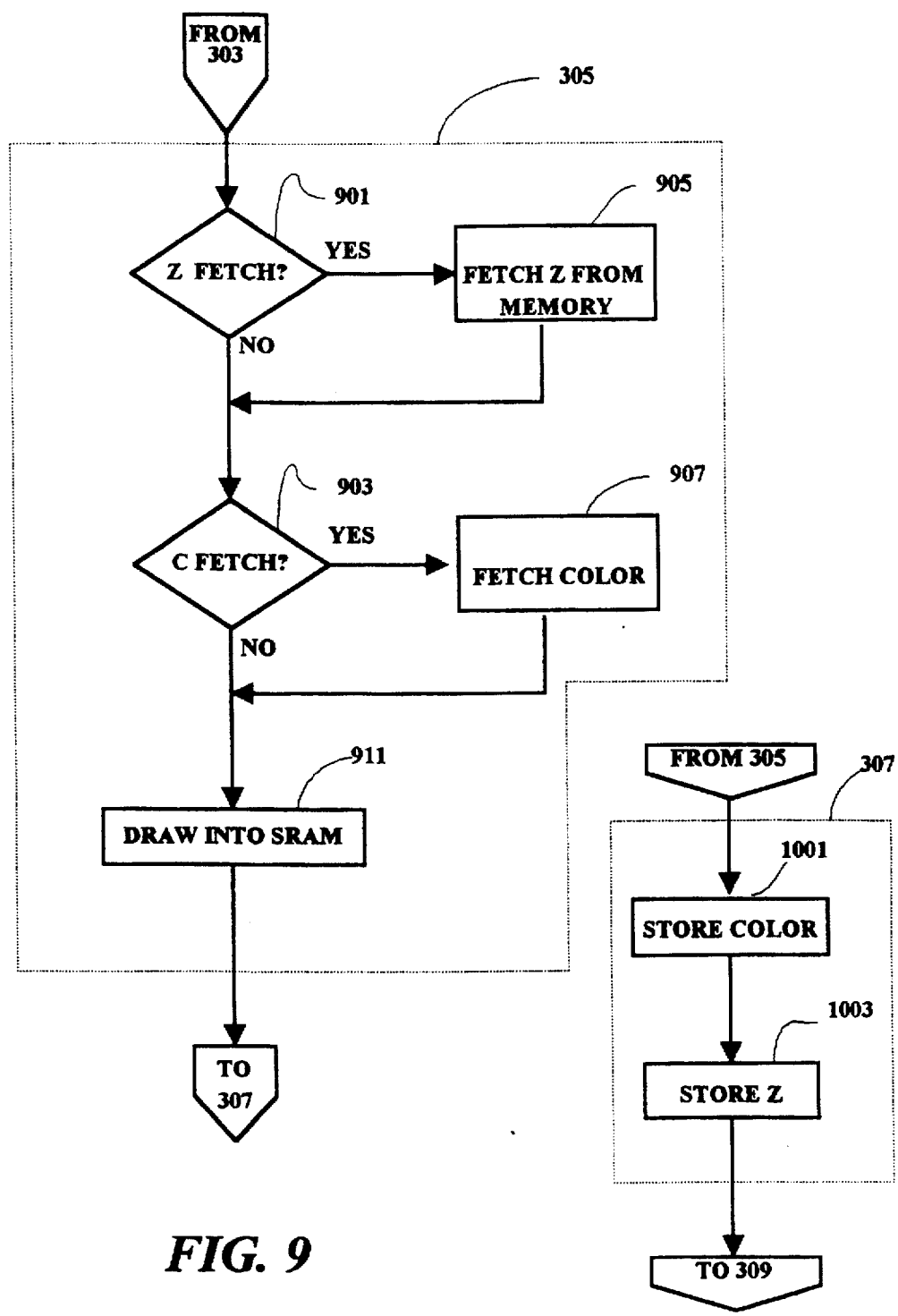
FIG. 9 is a flowchart illustrating the details of one of the operations shown in FIG. 3.
FIG. 10 is a flowchart illustrating the details of another operation shown in FIG. 3.

In FIG. 9, the DRAW SEGMENT step 305 of FIG. 3 is illustrated in more detail. Following the determination of a memory segment shape 303, a determination is made regarding whether or not a Z FETCH 901 is required. If a Z FETCH 901 is required, a Z value is fetched from the Z buffer of the graphics controller and "attached" or referenced to the particular "1" bit point being processed. Similarly, if a COLOR FETCH or C FETCH 903 is required, i.e. if there is any color associated with the point being processed, then the color is fetched 907 and the method continues by drawing the assembled file into SRAM or scratch pad memory i.e. DRAW INTO SRAM 911.

Figure 11:
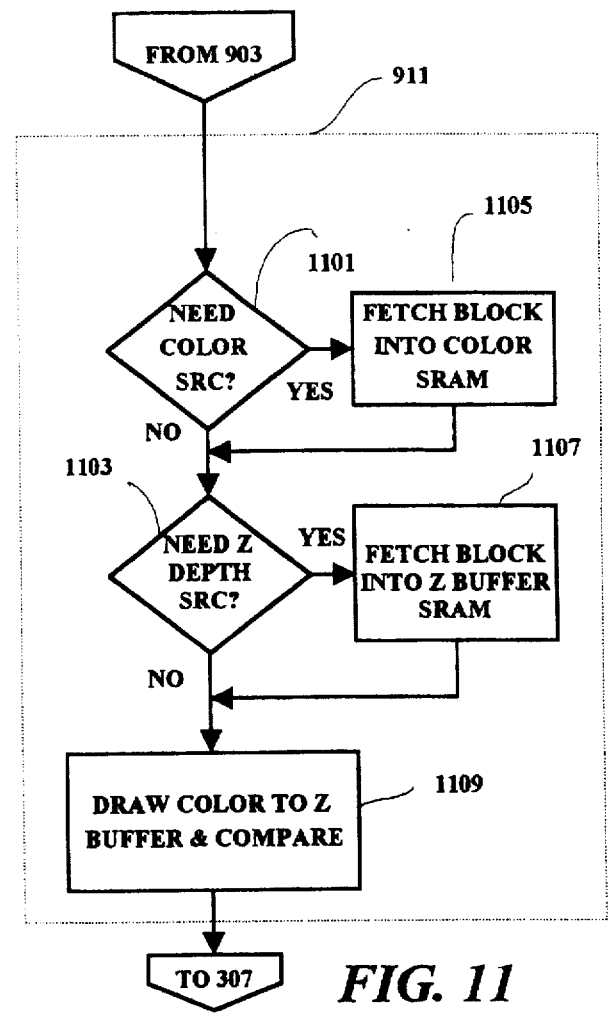
FIG. 11 is a flowchart illustrating the details of the "DRAW INTO SRAM" step shown in FIG. 9.

The DRAW INTO SRAM step 911 is shown in more detail in FIG. 11. After the Z and C fetches, 901 and 903, a determination is made as to whether or not a color source is needed 1101. If a color source is needed, e.g. for transparency effects or color source compare functions, then a block is fetched into a color SRAM 1105. Next a determination is made whether or not a Z depth source is needed 1103. If so, a block is fetched into the Z buffer SRAM 1107. The process then continues to DRAW COLOR TO Z BUFFER AND COMPARE 1109. The DRAW COLOR TO Z BUFFER & COMPARE step 1109 is illustrated in more detail in FIG. 12.

Figure 12:
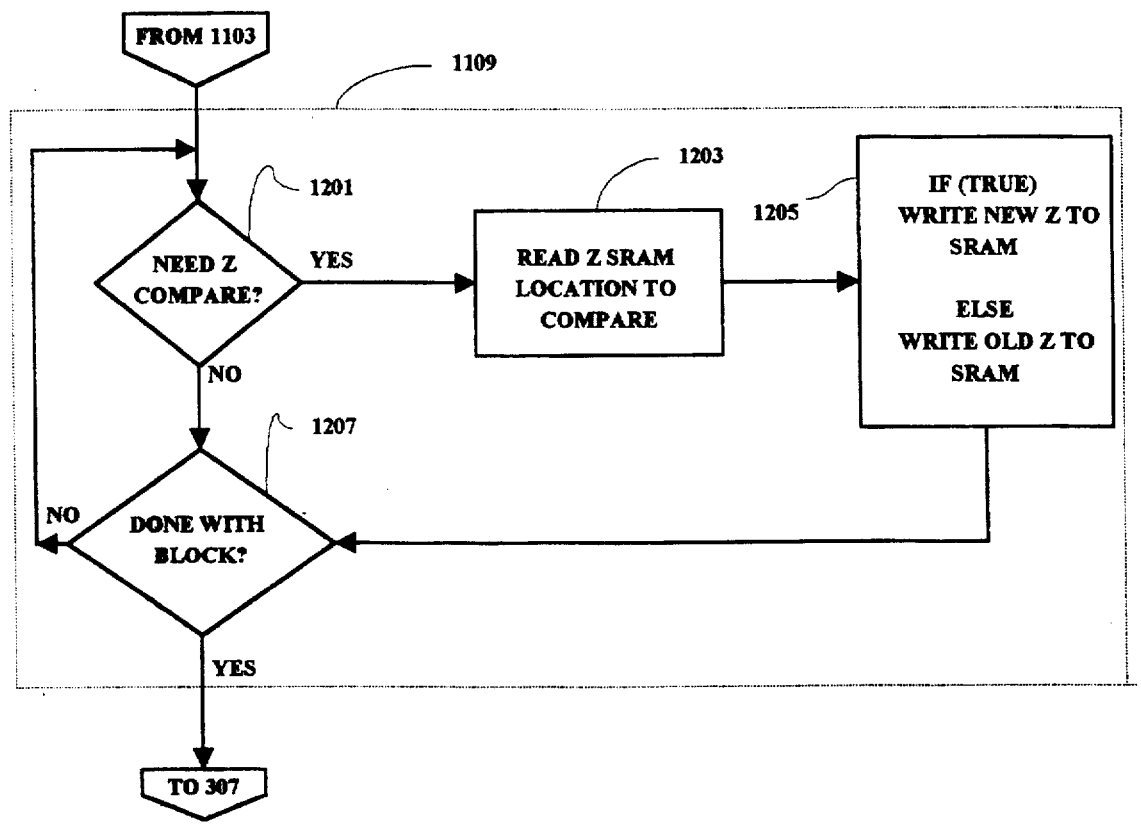
FIG. 12 is an illustration of the details of one of the steps of the flowchart shown in FIG. 11.

In FIG. 12, a determination is first made as to whether or not a Z COMPARE is needed 1201. If a Z COMPARE is required, the Z SRAM location for the point being analyzed is read for comparison 1203. If the new Z value is greater (or less) than the stored Z value (depending upon the conventions of the system), the new value is written into the SRAM 1205. Otherwise the old Z value is written. The process then determines whether the block is finished 1207, and if not, the process returns to step 1201. If the block is finished, the process continues by moving to the STORE SEGMENT step 307.

As shown in FIG. 10, the STORE SEGMENT function 307 operates to store the color i.e. STORE COLOR 1001, and also to store the Z or the depth value, i.e. STORE Z 1003, of the "1" bit point being processed. The process then continues by making a determination whether or not the particular polygon being drawn has been finished i.e. DONE POLY 309 in FIG. 3. For example, if the last "1" bit point being analyzed or processed was point 815 in FIG. 8, then the polygon being drawn 800 would not be fully segmented or finished, and the DONE POLY inquiry 309 would return a negative determination and the process would return to find the next "1" bit i.e. FIND SEGMENT START "1" BIT 401 shown in FIG. 4. If the particular polygon being drawn is finished to the BOTTOM point in the polygon, then a determination is made whether or not there are any more Polys to be drawn 311 for the particular frame being processed. If there are no more polygons to be drawn, the process is DONE 313. If there are more polys to be drawn, i.e. if there are more DRAW POLY commands, then the process returns to the DRAW POLY step 301 and continues the process, as hereinbefore explained, with regard to the next polygon. The described processing continues in an iterative manner until all of the polygons for a particular frame have been redrawn in SRAM in accordance with the disclosed method. Using the disclosed method, the frame polygon data is reconfigured or reassembled and stored in a compact and highly efficient manner thereby enabling much faster processing which is especially suited for graphics and three dimensional applications.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for storing information representative of an object capable of being displayed on a display device, said method comprising:

determining a first object point on an object to be stored in memory;

marking a first memory segment location in a memory segment portion of said memory, said first memory segment location corresponding to said first object point;

incrementally traversing said object along a predetermined traversal path relative to said first object point to determine a next object point on said object;

marking a next memory segment location in said memory segment portion of said memory, said next memory location corresponding to said next object point;

determining a difference in incremental movements between said first object point and said next object point along said traversal path; and defining dimensions of said memory segment portion of said memory in accordance with said difference in incremental movements between said first traversal path.

2. The method as set forth in claim 1 wherein said incrementally traversing step is iterated so long as said difference in incremental movements between said first object point and any next object point is less than a predetermined memory segment portion of said memory.

3. The method as set forth in claim 2 wherein said incrementally traversing step is iteratively accomplished relative to an immediately preceding next object point.

4. The method as set forth in claim 3 wherein said incrementally traversing step is accomplished in accordance with a predetermined pattern.

5. The method as set forth in claim 4 wherein said predetermined pattern is comprised of alternate vertical and horizontal movements.

6. The method as set forth in claim 5 wherein said first and next object points are located on edges of said object.

7. The method as set forth in claim 6 wherein each of said vertical and horizontal movements is related to a bit in said memory segment portion of said memory.

8. The method as set forth in claim 4 wherein said predetermined pattern is related to a slope characteristic of said object.

9. The method as set forth in claim 7 wherein said memory segment portion comprises an SRAM memory.

10. A storage medium including machine readable indicia, said storage medium being selectively coupled to a reading device, said reading device being coupled to processing circuitry, said reading device being selectively operable to read said machine readable indicia and provide program signals representative thereof, said program signals being effective to cause said processing circuitry to store information representative of an object capable of being drawn on a display device by accomplishing the steps of:

determining a first object point on said object to be stored in memory;

marking a first memory segment location in a memory segment portion of said memory, said first memory segment location corresponding to said first object point;

incrementally traversing said object along a predetermined traversal path relative to said first object point to determine a next object point on said object;

marking a next memory segment location in said memory segment portion of said memory, said next memory location corresponding to said next object point;

determining a difference in incremental movements between said first object point and said next object point along said traversal path; and defining dimensions of said memory segment portion of said memory in accordance with said difference in incremental movements between said first object point and said next object point along said traversal path.

11. The storage medium as set forth in claim 10 wherein said incrementally traversing step is iterated so long as said difference in incremental movements between said first object point and any next object point is less than a predetermined memory segment portion of said memory.

12. The storage medium as set forth in claim 11 wherein said incrementally traversing step is iteratively accomplished relative to an immediately preceding next object point.

13. The storage medium as set forth in claim 12 wherein said incrementally traversing step is accomplished in accordance with a predetermined pattern.

14. The storage medium as set forth in claim 13 wherein said predetermined pattern is comprised of alternate vertical and horizontal movements.

15. The storage medium as set forth in claim 14 wherein said first and next object points are located on edges of said object.

16. The storage medium as set forth in claim 15 wherein each of said vertical and horizontal movements is related to a bit in said memory segment portion of said memory.

17. The storage medium as set forth in claim 13 wherein said predetermined pattern is related to a slope characteristic of said object.

18. The storage medium as set forth in claim 16 wherein said memory segment portion comprises an SRAM memory.

19. A computer based graphics station, including a computer system comprising a main bus and a display device, and a graphics subsystem, said graphics subsystem comprising a graphics processor device connected to said main bus and to said display device, said graphics subsystem further including a graphics memory coupled to said graphics processor, said graphics subsystem being selectively operable for storing and processing information representative of an object to be drawn on the display device, by accomplishing the steps of:

determining a first object point on the object to be stored in memory;

marking a first memory segment location in a memory segment portion of said memory, said first memory segment location corresponding to said first object point;

incrementally traversing said object along a predetermined traversal path relative to said first object point to determine a next object point on said object;

marking a next memory segment location in said memory segment portion of said memory, said next memory location corresponding to said next object point;

determining a difference in incremental movements between said first object point and said next object point along said traversal path; and defining dimensions of said memory segment portion of said memory in accordance with said difference in incremental movements between said first object point and said next object point along said traversal path.

20. The graphics station as set forth in claim 19 wherein said incrementally traversing step is iterated so long as said difference in incremental movements between said first object point and any next object point is less than a predetermined memory segment portion of said memory.

21. The graphics station as set forth in claim 20 wherein said incrementally traversing step is iteratively accomplished relative to an immediately preceding next object point.

22. The graphics station as set forth in claim 21 wherein said incrementally traversing step is accomplished in accordance with a predetermined pattern.

23. The graphics station as set forth in claim 22 wherein said predetermined pattern is comprised of alternate vertical and horizontal movements.

24. The graphics station as set forth in claim 23 wherein said first and next object points are located on edges of said object.

25. The graphics station as set forth in claim 24 wherein each of said vertical and horizontal movements is related to a bit in said memory segment portion of said memory.

26. The graphics station as set forth in claim 22 wherein said predetermined pattern is related to a slope characteristic of said object.

27. The graphics station as set forth in claim 25 wherein said memory segment portion comprises an SRAM memory.

* * * * *